(12) United States Patent
Morris et al.

(10) Patent No.: US 11,361,299 B2
(45) Date of Patent: Jun. 14, 2022

(54) METHODS AND SYSTEMS FOR COMMUNICATION BETWEEN A FUEL DISPENSER AND A MOBILE DEVICE

(71) Applicant: Wayne Fueling Systems LLC, Austin, TX (US)

(72) Inventors: John J. Morris, Austin, TX (US); Weiming Tang, Austin, TX (US)

(73) Assignee: WAYNE FUELING SYSTEMS LLC, Austin, TX (US)

( * ) Notice: Subject to any disclaimer, the term of this patent is extended or adjusted under 35 U.S.C. 154(b) by 1201 days.

(21) Appl. No.: 15/314,840

(22) PCT Filed: May 29, 2015

(86) PCT No.: PCT/US2015/033255
§ 371 (c)(1),
(2) Date: Nov. 29, 2016

(87) PCT Pub. No.: WO2015/184306
PCT Pub. Date: Dec. 3, 2015

(65) Prior Publication Data
US 2017/0109722 A1    Apr. 20, 2017

Related U.S. Application Data

(60) Provisional application No. 62/005,622, filed on May 30, 2014.

(51) Int. Cl.
*G06Q 20/32* (2012.01)
*G06Q 50/06* (2012.01)

(52) U.S. Cl.
CPC ........... *G06Q 20/32* (2013.01); *G06Q 20/327* (2013.01); *G06Q 50/06* (2013.01)

(58) Field of Classification Search
CPC ....... G06Q 50/06; G06Q 20/32; G06Q 20/327
USPC .......................................................... 705/39
See application file for complete search history.

(56) References Cited

U.S. PATENT DOCUMENTS

| | | | |
|---|---|---|---|
| 7,941,289 B2 | 5/2011 | Harrell | |
| 8,554,688 B2 * | 10/2013 | Harrell | G06Q 20/347 705/64 |
| 8,925,808 B2 | 1/2015 | Harrell | |
| 2007/0119859 A1 | 5/2007 | Harrell | |
| 2009/0048945 A1 | 2/2009 | DeLine | |

(Continued)

OTHER PUBLICATIONS

Anonymous: Bluetooth Low Energy—Wikipedia. <https://en.wikipedia.org/w/index.php?title=Bluetooth_Low_Energy&oldid=610708723> [retrieved on Sep. 20, 2017].

(Continued)

*Primary Examiner* — Shahid Merchant
*Assistant Examiner* — Merritt J Hasbrouck
(74) *Attorney, Agent, or Firm* — Mintz Levin Cohn Ferris Glovsky and Popeo, PC; Lisa Adams (57) ABSTRACT

Various methods and systems for communication between a fuel dispenser and a mobile device are provided. In one embodiment, a method of operating a fuel dispenser to communicate with a mobile device is provided that includes detecting the mobile device in proximity to the fuel dispenser, and communicating with the mobile device to receive input from and/or send information to the mobile device. The communication can use Bluetooth® Low Energy (BLE).

20 Claims, 8 Drawing Sheets

(56) References Cited

U.S. PATENT DOCUMENTS

| | | | |
|---|---|---|---|
| 2013/0099892 A1 | 4/2013 | Tucker et al. | |
| 2013/0232019 A1 | 9/2013 | Frieden et al. | |
| 2013/0246171 A1* | 9/2013 | Carapelli | G06Q 20/3278 |
| | | | 705/14.51 |
| 2014/0100692 A1* | 4/2014 | Chittenden, Jr | G07F 15/001 |
| | | | 700/236 |
| 2014/0172179 A1* | 6/2014 | Baudin, Jr | G07F 13/025 |
| | | | 700/283 |
| 2014/0337234 A1 | 11/2014 | Tang et al. | |
| 2014/0351138 A1* | 11/2014 | Frieden | G06Q 20/325 |
| | | | 705/44 |
| 2015/0105920 A1* | 4/2015 | Carapelli | G07F 13/025 |
| | | | 700/283 |
| 2015/0106196 A1* | 4/2015 | Williams | G06Q 20/227 |
| | | | 705/14.51 |
| 2015/0143116 A1 | 5/2015 | Tang et al. | |

OTHER PUBLICATIONS

European Search Report for Application No. 15799281.9 dated Sep. 28, 2017.
Anonymous: "iBeacon—Wikipedia," May 29, 2014, XP055615493, Retrieved from <https://en.wikipedia.org/w/index.php?title=IBeason&oldid=608933088> [retrieved on Aug. 27, 2019].
European Summons to Attend Oral Proceedings for Application No. 15799281.9 dated Sep. 10, 2019.

* cited by examiner

METHODS AND SYSTEMS FOR COMMUNICATION BETWEEN A FUEL DISPENSER AND A MOBILE DEVICE

CROSS REFERENCE

The present application claims priority to PCT Application No. PCT/US2015/033255 entitled "Methods and Systems for Communication Between a Fuel Dispenser and Mobile Device," filed May 29, 2015 which is a PCT of U.S. Provisional Application No. 62/005,622 entitled "Method and System for Communication between Fuel Dispenser and Mobile Device" filed May 30, 2014, which are hereby incorporated by reference in their entireties.

FIELD

The subject matter disclosed herein generally relates to systems and methods for communication between a fuel dispenser and a mobile device.

BACKGROUND

As mobile device technologies become more powerful, mobile devices are used for an increasingly large range of tasks. A mobile device can execute various mobile applications that have been developed to simplify and improve user experience. For example, payment applications exist that enable a user to play games, pay for goods and services, perform various financial and banking transactions, communicate with other users, and perform a variety of other tasks. Users can utilize their mobile device while travelling, waiting for some events to occur and in other multiple scenarios where mobile applications allow users to spend their time more enjoyably and efficiently.

Furthermore, a mobile device can be configured to communicate via a wireless communication protocol such as Bluetooth® which allows establishing short-range communications with the mobile device. For example, Bluetooth® Low Energy (BLE) standard is part of the Bluetooth® 4.0 standard. Devices using BLE wireless technology consume a fraction of the power of standard Bluetooth-enabled devices. A BLE-enabled device can communicate with another device, which is sometimes referred to as a beacon, to detect a signal emitted by the beacon and thus determine that the mobile device is in proximity to the beacon. For example, in a shopping mall, a mobile device can be used to detect that a user carrying the device is in proximity to a particular isle.

Some systems involve wireless communication between a mobile device and a payment terminal for payment of dispensed fuel. In fueling environments, the payment terminal is often disposed in an unmanned, outdoor setting to be accessible to fuel customers. However, while the terminals may be enabled for wireless communication to facilitate customer payment for fuel, the communication is traditionally limited to the payment context.

Fuel pumping using a fuel dispenser conventionally requires a user, such as a consumer or a site operator, to interact with a fuel dispenser. The fuel dispenser typically includes a display which can be associated with a keyboard and/or other input devices that allow a consumer to select a type of payment, select a fuel grade, and to initiate the fuel pumping. To pay for the fuel, consumers typically swipe a payment card through a slot of a card reader associated with the fuel dispenser or pay at a counter in a fuel station. Fuel dispensers can also be operated by a site operator that obtains a payment card from a consumer and performs the same operations instead of the consumer. Thus, fuel pumping is conventionally a labor-intensive process for the user.

Accordingly, there remains a need for improved systems and methods for communication between a fuel dispenser and a mobile device.

BRIEF DESCRIPTION

Various methods and systems for communication between a fuel dispenser and a mobile device are provided. In one aspect, a method of operating a fuel dispenser to communicate with a mobile device is provided that in one embodiment can include detecting a mobile device in proximity to a fuel dispenser, and the fuel dispenser communicating with the mobile device to receive input from the mobile device relating to controlling operation of the fuel dispenser to deliver fuel to a vehicle and to transmit information to the mobile device during a time when the fuel dispenser delivers fuel to the vehicle.

In another aspect, a communication system is provided that in one embodiment can include a wireless transceiver configured to detect a mobile device using a BLE protocol, and a processor configured to receive input from the mobile device relating to controlling operation of a fuel dispenser to deliver fuel to a vehicle and configured to provide information to the mobile device.

In another aspect, a method of operating a mobile computing device to communicate with a fuel dispenser is provided that in one embodiment can include establishing a BLE connection with a fuel dispenser, and communicating with the fuel dispenser over the BLE connection.

In another aspect, a method of operating a portable computing device to communicate with at least one fuel dispenser is provided that in one embodiment can include establishing a BLE connection with at least one fuel dispenser, and communicating with the at least one fuel dispenser over the BLE connection to control operation of the at least one fuel dispenser.

In another aspect, a non-transitory computer-readable storage medium storing computer-executable instructions that, when executed by at least one processor, cause the at least one processor to perform a method that in one embodiment can include interacting with a fuel dispenser detected to be located in proximity to a mobile computing device over a BLE connection.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the systems and methods disclosed herein. One or more examples of these embodiments are illustrated in the accompanying drawings. Those skilled in the art will appreciate that the systems and methods specifically described herein and illustrated in the accompanying drawings are non-limiting exemplary embodiments and that the scope of the present invention is defined solely by the claims. In the present disclosure, like-named components of the embodiments generally have similar features, and thus within a particular embodiment each feature of each like-named component is not necessarily fully elaborated upon. The features illustrated or described in connection with one exemplary embodiment may be combined with the features of other embodiments. Such modifications and variations are intended to be included within the scope of the present invention.

Various exemplary systems and methods for communication between a fuel dispenser and a mobile device are provided. The systems and methods disclosed herein produce a number of advantages and/or technical effects.

In general, a fuel pumping experience can be improved when a user device (e.g., a mobile device) is enabled to communicate with a fuel dispenser over a wireless connection. In particular, in at least some embodiments, a mobile device (also referred to herein as a "mobile computing device") can be used to communicate with a fuel dispenser over a secure two-way connection such as, for example, a Bluetooth® connection. In at least some embodiments, a mobile device and a fuel dispenser can be configured to securely communicate using a Bluetooth® Low Energy (BLE) technology, which is a wireless personal area network technology capable of providing reduced power consumption and cost relative to "standard" Bluetooth® technology.

The communication between the mobile device and the fuel dispenser can be secured using any of a variety of security techniques, as will be appreciated by a person skilled in the art. Exemplary embodiments of security techniques include those described in U.S. application Ser. No. 13/890,734 entitled "Systems And Methods For Secure Communication" filed on May 9, 2013, and U.S. application Ser. No. 14/083,948 entitled "Systems And Methods For Convenient And Secure Mobile Transactions" filed on Nov. 19, 2013, which are hereby incorporated by reference in their entireties.

The secure two-way interaction between a fuel dispenser and a user device (e.g., a mobile device) can facilitate the fuel pumping and payment process and/or can improve overall user experience. For example, a fuel dispenser enabled with the BLE technology can enable a user of a BLE-enabled (marketed as "Bluetooth Smart®") mobile device to interact with the BLE-enabled fuel dispenser. The BLE-enabled fuel dispenser can be configured to advertise itself to the mobile device when the device is in proximity to the fuel dispenser. For example, when a vehicle operated by the user of the mobile device is approaching the fuel dispenser, the mobile device can be configured to detect that the fuel dispenser once the mobile device is within a range of a Bluetooth® transceiver associated with the fuel dispenser. Once the mobile device and fuel dispenser pair and establish a connection (e.g., a BLE connection), they can interact in any number of ways, as discussed further below.

In at least some embodiments, experience of fuel dispenser consumers can be improved by enabling the consumers to use their mobile devices to provide instructions to the fuel dispenser relating to delivering fuel to a reservoir, such as a vehicle, portable fuel tank, or other equipment, and/or to perform payment transactions.

The fuel dispenser can be configured to transmit information to the mobile device relating to the fuel delivery process. For example, information relating to a status of the fuel delivery process can be provided to the mobile device in real time. The fuel dispenser can be configured to transmit additional information to the mobile device, such as advertisements, loyalty promotions, news, music, video, applications, and any other suitable content. The additional information can be provided to the mobile device before, during, and/or after the fuel delivery. Furthermore, the additional information can be location-specific such that the user can receive information about nearby stores, restaurants, and/or other establishments that can be of interest to the user. In this way, consumer experience can be enriched as the consumer is entertained and receives useful information at a time during which the consumer is typically idly waiting for the fueling process to complete. Moreover, in at least some embodiments, to pay for the fuel, the user may not be required to interact with a display of the fuel dispenser, which simplifies the payment process since payment can be instead accomplished via the mobile device, the use of which is typically very familiar and comfortable to users. Users can spend less time outside viewing or otherwise physically interacting with the fuel dispenser for fuel payment, which is typically outdoors, with users instead being able to be inside their vehicle and/or inside a fuel station building to accomplish payment using the mobile device, which can be especially beneficial in undesirable weather.

In at least some embodiments, the techniques described herein can be used by site operators or other users to maintain and/or control operation of a fuel dispenser. For example, the described techniques can be used to maintain operation of one or more fuel dispensers using a BLE or other wireless connection between the fuel dispenser and a mobile device. A user can utilize the mobile device to instruct the dispenser to deliver fuel and manage payment transaction. Furthermore, additionally or alternatively, the user can manage delivering of additional information by the fuel dispenser to the mobile device.

In at least some embodiments, servicemen or other users can use a mobile device to interact with one or more fuel dispensers to configure the fuel dispensers, which can involve any one or more actions such as installing software, installing firmware, setting prices and any other parameters, calibrating the fuel dispensers, and installing media applications on the fuel dispensers. Furthermore, the mobile device can be used to interact with selected one(s) of the fuel dispensers to obtain information relating to a status of the selected fuel dispenser(s), such as an overall status of the fuel dispenser(s), a status of any of its components and media, health information, software logs, and any other suitable information. The information can then be used to assess an operating condition of the fuel dispenser(s) and service the dispenser(s) accordingly.

It should be appreciated that even though, in the exemplary embodiments, a mobile device and a fuel dispenser are configured to pair and communicate over a BLE-connection, the described techniques are not limited to any particular type of wireless communication, and the mobile device and fuel dispenser may communicate using any other suitable wireless communication technology.

Figure 1:
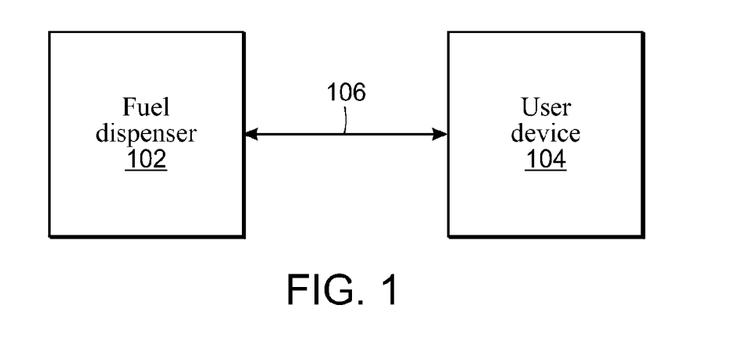
FIG. 1 is a schematic diagram of one exemplary embodiment of a fueling environment.

FIG. 1 illustrates an exemplary embodiment of a fueling environment 100 in which one or more of the systems and methods disclosed herein can be implemented. The fueling environment 100 generally includes a fuel dispenser 102 for dispensing fuel and a user device 104 associated with a user (e.g., a consumer, a site operator, service personnel or regulators seeking access to the fuel dispenser, or any other user(s)).

In at least some embodiments, the fuel dispenser 102 can include various components well understood by those skilled in the art, such as a nozzle, a pump, a meter, buttons for selecting fuel grade, an electronic display screen, a payment terminal, and any other components which are not shown herein for the sake of simplicity. The fuel dispenser 102 can also include a computer system, as described below. Moreover, in at least some embodiments, the fuel dispenser 102 can have a modified configuration. For example, the electronic display screen of the fuel dispenser 102 may be simplified.

The user device 104 can be or can include any mobile computing device that is configured to exchange data over a communications network, such as a mobile phone, tablet computer, laptop computer, and any other computing device. It should be appreciated that embodiments are not limited to any particular type of a computing device. For example, in some cases, the user device 104 can include a desktop computer or any other type of computing device that can be placed in proximity to the fuel dispenser 102. The user device 104 can be located within a vehicle, carried by a user, or otherwise delivered in proximity to the fuel dispenser 102. The user device 104 being mobile can allow the user to travel with the user device 104 between locations at which fuel dispensers are located, e.g., different gas stations, different islands of fuel dispensers at a relatively large fuel station, etc., and/or can allow the user device 104 to be used by different users working different shifts. The user thus does not need to learn details of using various types of user devices but can instead use the user device 104 of their own choice with which they are already familiar and/or can only spend time learning details of using their particular user device 104 instead of all possible interfaces that may be encountered at a fuel dispenser and required to use for fuel payment and/or fuel dispenser service. User experience can thus be improved by reducing an amount of user training time and/or by allowing users to use user devices with which they are most comfortable.

The user device 104 can be or can include a computer system, as described below. The user device 104 can be configured to communicate with the fuel dispenser 102 over a wireless communications network, for example, via a secure two-way connection, such as a Bluetooth® connection. In at least some embodiments, the connection can include a Bluetooth® Low Energy (BLE) connection 106. However, it should be appreciated that, additionally or alternatively, the user device 104 can be configured to communicate with the fuel dispenser 102 over any other type of wireless connection, such as, for example, near-field communication (NFC), Wi-Fi, infrared (IR), and others.

Different types of user devices (e.g., user devices having different operating systems, different forms of computing devices, etc.) may be more readily available in different areas of the world due to any number of factors such as cost, available user device retailers, and government regulations. The user device 104 can include any of these different types of user devices. The systems and methods provided herein can thus be adapted for use with any type of user device, e.g., apps can be developed for various user device platforms that generally provide the same functionality and user experience subject to that particular platform's capabilities. The systems and methods thus allow for jurisdictional scaling (e.g., global scaling, scaling across different states, etc.) for a retailer or other seller using the systems and methods described herein. Similarly, the systems and methods described herein can be particularly designed for use in any of the different geographic areas by reflecting a particular geographic area's regulations, whether the regulations be local, state, national, international, or on some other scale. For example, apps executable using the user devices to perform as described herein can reflect each of that geographic area's regulations that a government inspector, fuel station employee, or other user may need to check at fuel dispensers, thereby helping to ensure that regulatory requirements are checked on schedule and/or are not accidentally overlooked during an inspection. In other words, a fuel dispenser's particular requirements can be incorporated into use of the user device 104 in an inspection context. In addition or in alternative to a fuel dispenser's associated regulatory requirements, the particular needs of a particular fuel dispenser can be incorporated into use of the user device 104 in other contexts, such as in service contexts (e.g., by the fuel dispenser 102 being configured to self-identify itself to the user device 104 to enable prior service information for the fuel dispenser 102 to be accessed by the user device 104, etc.) and in payment contexts (e.g., by the fuel dispenser 102 being configured to self-identify itself to the user device 104 to facilitate payment record-keeping, etc.)

In at least some embodiments, the fuel dispenser 102 can be or can include a BLE-enabled device. As mentioned above, the user device 104 can also be or include a BLE-enabled device. Thus, the BLE connection can be established between the fuel dispenser 102 and the user device 104 when the user device 104 is in proximity to the fuel dispenser 102. The fuel dispenser 102 and the user device 104 can pair and establish the connection 106, which can then be used for interaction between these devices. The fuel dispenser 102 can be configured to pair with the user device 104 and establish the connection 106 using any other type of wireless connection, as mentioned above.

It should be appreciated that, in the present disclosure, functions described as being performed by a user can also be performed by the user device 104 and vice versa unless the context suggests otherwise, as should be understood by those skilled in the art.

Figure 2:
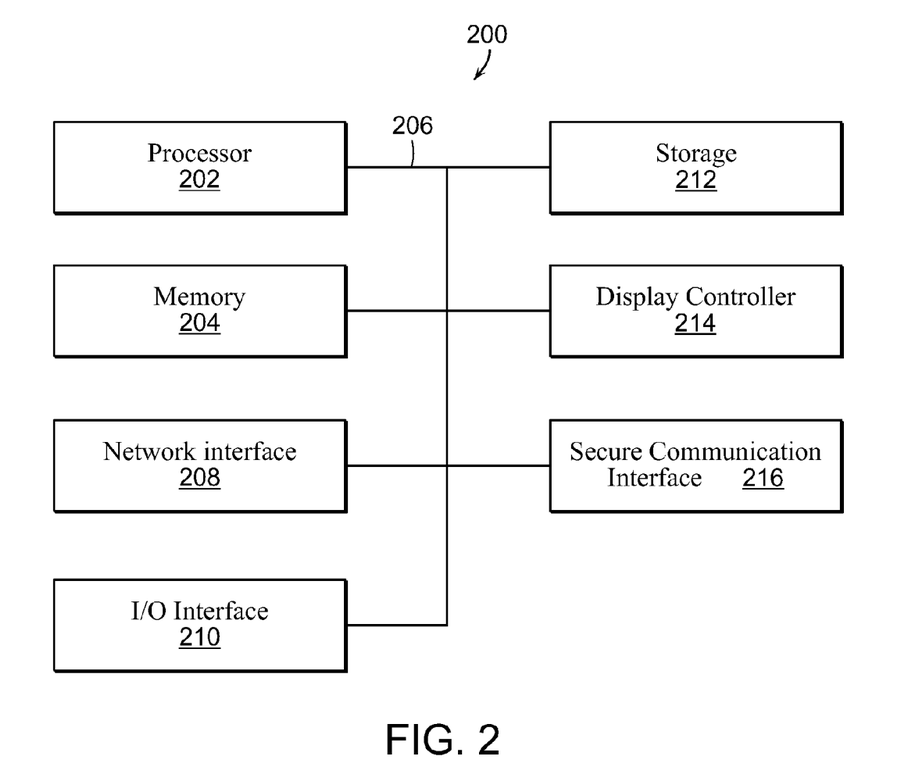
FIG. 2 is a schematic diagram of one exemplary embodiment of a computer system.

As noted above, the fuel dispenser 102 and the user device 104 can each include or be implemented using one or more computer systems. FIG. 2 illustrates an exemplary architecture of a computer system 200. Although an exemplary computer system is depicted and described herein, it will be appreciated that this is for sake of generality and convenience. In other embodiments, computer systems that differ in architecture and operation from that shown and described here can be used for any of the fuel dispenser 102 and the user device 104.

The computer system 200 can include a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multi-processor systems.

The computer system 200 can also include a memory 204, which provides temporary or permanent storage for computer-executable instructions to be executed by the processor 202 or for data that is processed by the processor 202. The memory 204 can include read-only memory (ROM), flash memory, one or more varieties of random access memory (RAM), and/or a combination of memory technologies.

The various elements of the computer system 200 can be coupled to one another. For example, the processor 202 can be coupled to the memory 204. The various elements of the computer system 200 can be directly coupled to one another or can be coupled to one another via one or more intermediate components. In the illustrated embodiment, the various elements of the computer system 200 can be coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 can also include a network interface 208 which enables the computer system 200 to communicate with remote devices (e.g., other computer systems) over a network. In the case of the user device 104, the network interface 208 can facilitate communication with the fuel dispenser 102.

The computer system 200 can also include an input/output (I/O) interface 210 which facilitates communication between one or more input devices, one or more output devices, and the various other components of the computer system 200. Exemplary input and output devices include keypads, touch screens, buttons, magnetic-stripe card readers, lights, speakers, IR remote controls, dispenser sales displays, and so forth.

The computer system 200 can also include a storage device 212, which can include one or more suitable storage media for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, universal serial bus (USB) drives, optical drives, various media disks or cards, memory technologies, and/or any combination thereof and can be directly connected to the other components of the computer system 200 or remotely connected thereto, such as over a network.

As shown in FIG. 2, the computer system 200 can also include a display controller 214 which can include a video processor and a video memory, and can generate images to be displayed on one or more electronic displays in accordance with instructions received from the processor 202.

As also shown in FIG. 2, the computer system 200 can include a secure communication interface 216 through which the computer system 200 can conduct mutual authentication procedures and communicate with other computer systems using any of a variety of security techniques. The secure communication interface 216 can be wireless, such as, for example, a BLE interface. The computer system 200 can also include a wireless transceiver configured to communicate with a wireless transceiver of another device using one or more protocols such as the BLE protocol. The secure communication interfaces 216 of the fuel dispenser 102 and the user device 104 can be selected to provide a desired communication range.

It should be appreciated that secure communication interface 216 can be near-field communication (NFC), Wi-Fi, Bluetooth, ZigBee, or other type of interface. Furthermore, communication interface 216 can be wired (e.g., USB or Ethernet).

The various functions performed by the computer systems of the fuel dispenser 102 and the user device 104 can be logically described as being performed by one or more modules or units. It should be appreciated that such modules can be implemented in hardware, software, or a combination thereof. It should further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums, or can be transmitted as a signal, carrier wave, etc. Functions disclosed herein as being performed by a particular module can also be performed by any other module or combination of modules, and the fuel dispenser 102 and the user device 104 can include fewer or more modules than what is shown and described herein. As used herein, software refers to any executable program instructions, including firmware.

Figure 3A:
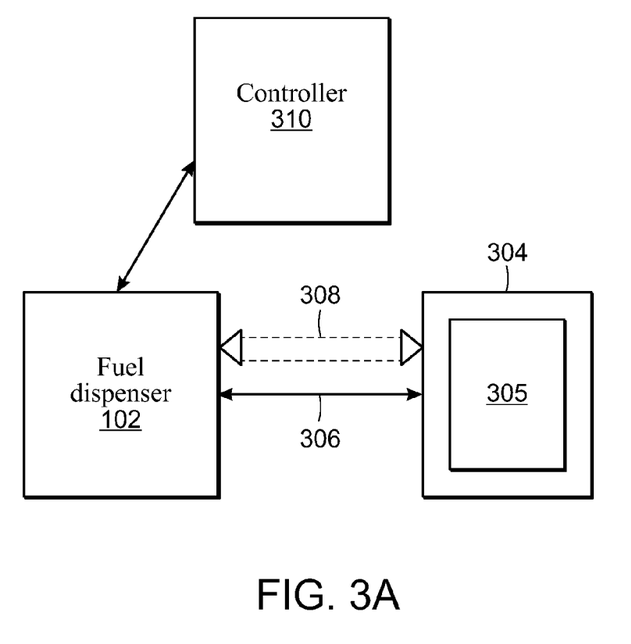
FIG. 3A is a block diagram illustrating a fuel dispenser and a mobile device communicating in accordance with at least some embodiments.

FIG. 3A illustrates an embodiment of a system including a fuel dispenser 102 and a mobile device 304 that can interact via a BLE connection 306. As shown, the fuel dispenser 102 can be configured to communicate with a controller 310 configured to interact with the fuel dispenser 102. As also shown in FIG. 3A, the mobile device 304, which can be configured to be operated by a user as discussed herein, can be configured to perform a payment transaction 308 over the connection 306. The payment transaction 308 can include any of a variety of steps, as will be appreciated by a person skilled in the art. Examples of payment transactions include those described in previously mentioned U.S. application Ser. No. 13/890,734 entitled "Systems And Methods For Secure Communication" filed on May 9, 2013, and U.S. application Ser. No. 14/083,948 entitled "Systems And Methods For Convenient And Secure Mobile Transactions" filed on Nov. 19, 2013, and in U.S. Pat. No. 8,925,808 entitled "Fuel Dispenser Commerce" filed Nov. 13, 2006, which is hereby incorporated by reference in its entirety.

In at least some embodiments, the fuel dispenser 102 can be configured to receive information from the mobile device 304 relating to the delivery of fuel by the fuel dispenser 102. The information can include any one or more input parameters, such as a type of payment, fuel grade, desired amount of fuel, and other suitable information relating to operation of the fuel dispenser. The input parameters can be based on user input received by the mobile device 304 (e.g., via a touch screen display, movement of the mobile device 304 in a predetermined manner, keyboard input, voice input, etc.) or in any other manner. In at least some embodiments, the interactions between the mobile device 304 and the fuel dispenser 102 can be controlled entirely via voice input received by the mobile device 304, which can provide for an easy user experience.

The mobile device 304 can be used to interact with the fuel dispenser 102 to receive and send information from and to the fuel dispenser. As in the illustrated embodiment, the mobile device 304 can be configured to display a user interface (e.g., a graphical user interface, etc.) on its display 305 through which a user can interact with the fuel dispenser 102. As a person skilled in the art will appreciate, the display 305 can include, for example, a touch display (e.g., a multi-touch display, etc.), a liquid crystal display (LCD), or any other type of display.

Figure 3B:
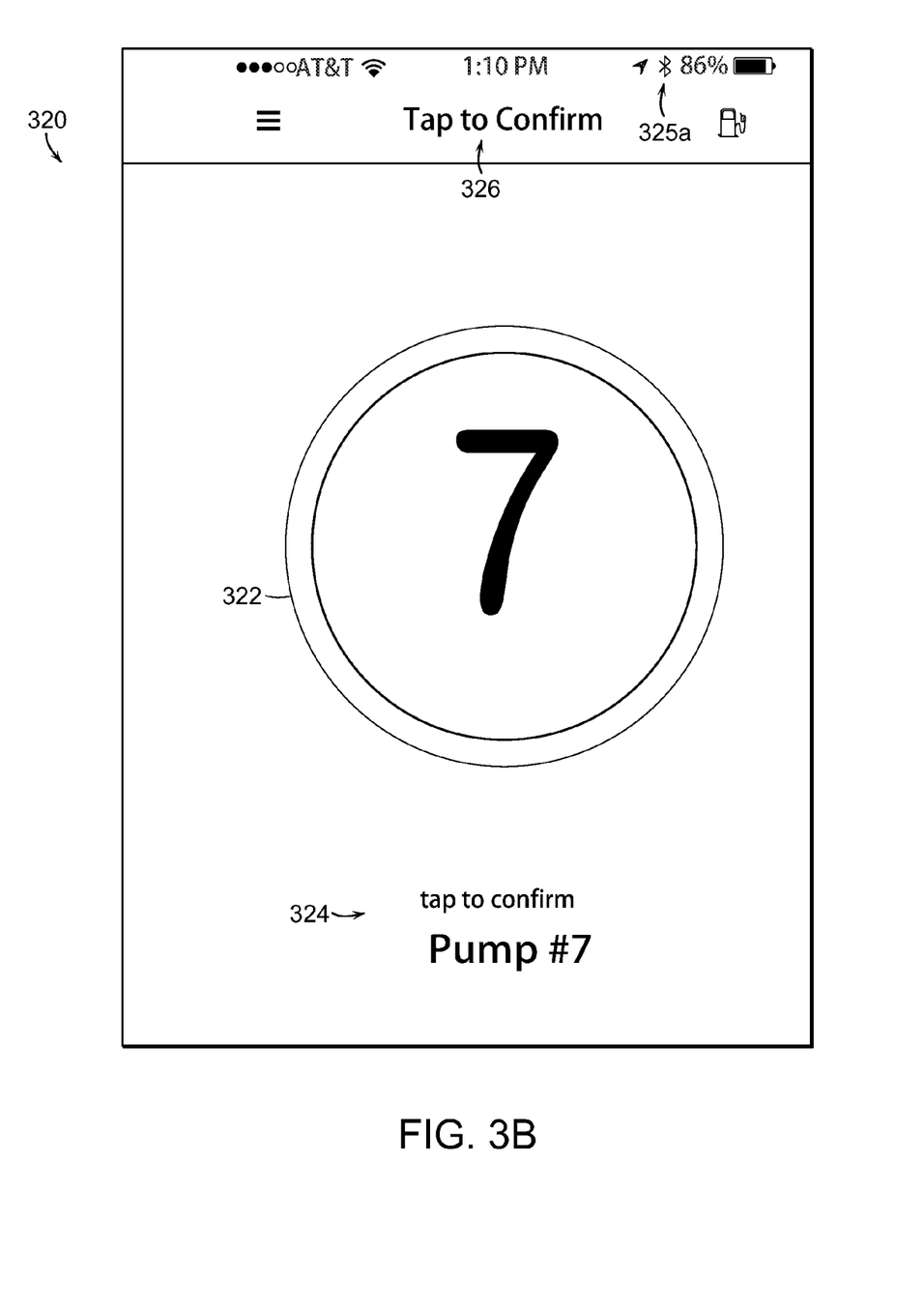
FIG. 3B is a diagram illustrating a graphical user interface rendered on a display of a mobile device communicating with at least one fuel dispenser in accordance with at least some embodiments.
Figure 3C:
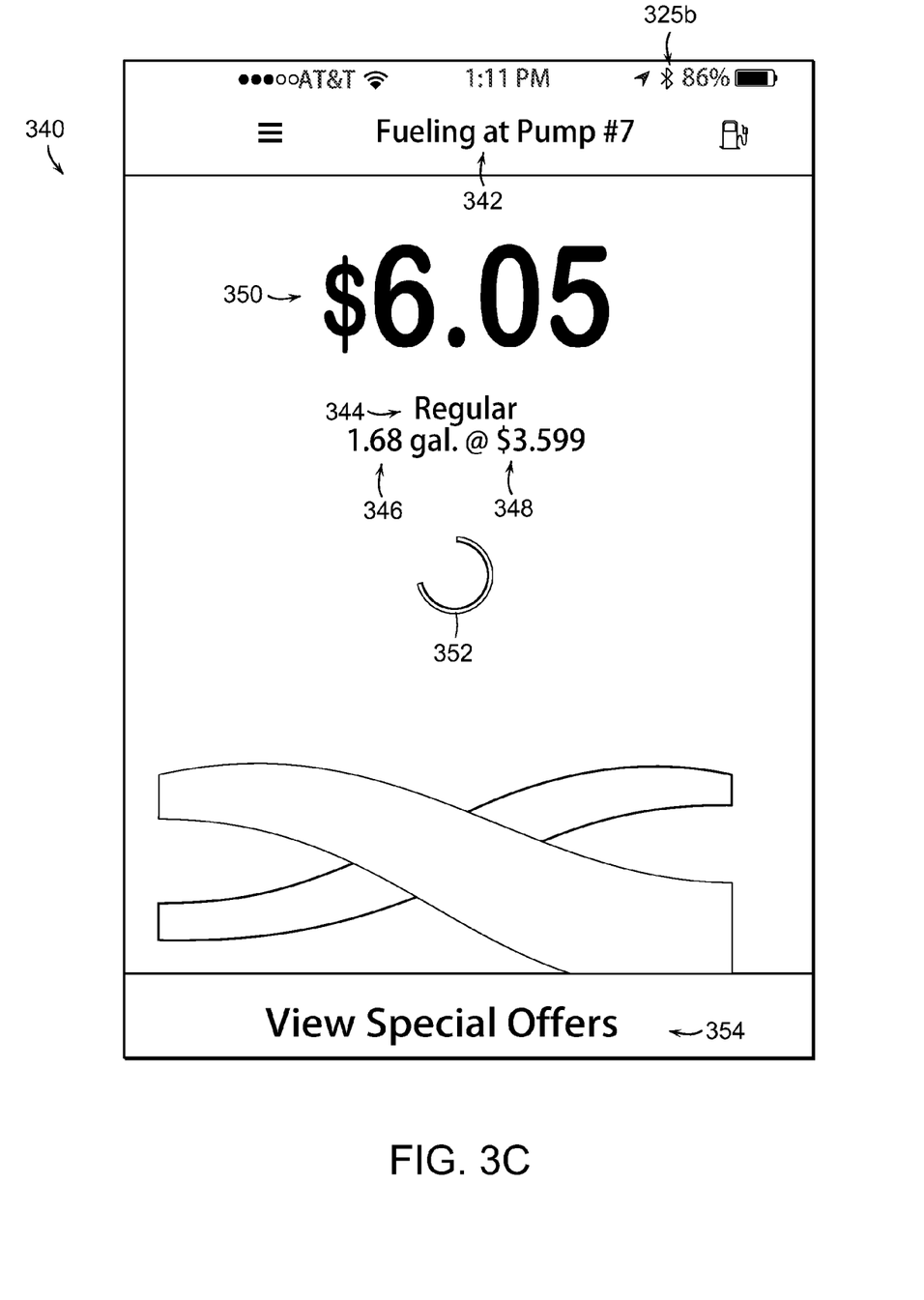
FIG. 3C is another diagram illustrating a graphical user interface rendered on a display of a mobile device communicating with at least one fuel dispenser in accordance with at least some embodiments.

The user interface can resemble or mirror information typically presented on a display of a fuel dispenser. FIGS. 3B and 3C illustrate examples of graphical user interfaces that can be presented to the user on the display 305 of the mobile device 304, which as illustrated can include a touch display. FIG. 3B illustrates a graphical user interface (GUI) 320 that can be presented to the user at a point of the process of interaction between the mobile device 304 and the fuel dispenser 102 when user input is requested with respect to the selection of the fuel dispenser 102. As shown in FIG. 3B, an icon 322 or other visual representation of identification information relating to the fuel dispenser 102 can be displayed on the GUI 320 so that the user can perceive in a convenient matter that fuel is to be pumped from a specific dispenser. Thus, in this example, the fuel dispenser 102 is identified as a pump number "7." As also shown in FIG. 3B, the GUI 320 can present to the user, along with the identification information on the pump being used, a visual representation 324 prompting the user to provide input confirming the selection of that specific pump identified by the icon 322. In this example, the visual representation 324 indicates that a tapping action is required to make the confirmation. An additional visual representation to receive the confirmation input can also be presented on the top of the GUI 320, as a visual representation 326. Any other information can be presented on the GUI 320 as well.

The GUI 320 can be presented on the display 305 automatically or in response to a suitable user input. For example, user input can be received with respect to a tool or platform embodying computer-executable instructions stored at least in part in computer-readable storage media (e.g., the memory 204) of the mobile device 304 and that, when executed by at least one processor (e.g., the processor 202) perform the described techniques. The tool or platform can be initiated upon user input such that the GUI 320 is rendered on the display 205. The fuel dispenser 102 and the mobile device 304 can detect each other automatically and the GUI 320 can also be presented automatically.

It should be appreciated that the mobile device 304 can interact with multiple fuel dispensers simultaneously. The more than one fuel dispenser can simultaneously announce their presence to the mobile device 304 through an "advertising" process. For example, when the user's vehicle approaches a gas station, at least some of the BLE-enabled fuel dispensers at the gas station can be configured to announce their presence to the mobile device 304. Information about a dispenser that is determined to be available or that is about to become available for pumping fuel (e.g., when there is a wait at the gas station such as in rush hour or during a holiday weekend), can be displayed on the display 305 in the form of the GUI 320. A particular dispenser can also be "suggested" to the user based on a distance between the fuel dispenser and the mobile device, a fuel grade desired by the user and other factors. In some cases, information about multiple fuel dispensers can be presented to the user on a GUI rendered by the display 305 such that the mobile device 304 can acquire information relating to user's selection of one of the available dispensers. In such cases, a GUI such as the GUI 320 can be presented to the user after user input was received indication a selection of the fuel dispenser number "7."

If the user's vehicle is stopped near a fuel dispenser (in this example, the fuel dispenser 102), a visual indicator such that the icon 322 and other accompanying icons and indicators can be presented to the user on the GUI 320. If the user's vehicle (and therefore the user's mobile device) moves so as to stop near another fuel dispenser (e.g., if the user decides to use another pump), information about that dispenser can be presented to the user. In this way, information about the fuel dispenser that is the closest to the mobile device of the user can be presented on the display of the mobile device.

As shown in FIG. 3B and as will be appreciated, the GUI 320 can include an indicator 325a indicating that the fuel dispenser identified at the GUI 320 is advertising and waiting for a BLE connection. Once the user input is received confirming the selection of the fuel dispenser, the mobile device 304 can initiate an outgoing connection request to that fuel dispenser.

After a user input is received specifying a selection and/or confirmation of the selection of a particular fuel dispenser, a BLE connection can be established between that fuel dispenser (in this example, fuel dispenser 102) and the mobile device 304. Also, a GUI such as a GUI 340 shown in FIG. 3C can be presented on the display 305. As shown in FIG. 3C, the indicator 325b (shown in FIG. 3B as indicator 325a) is modified ("turned on") to indicate that that BLE connection is established. The fact that the BLE connection has been established can be shown in any other manner in GUI 340.

As shown in FIG. 3C, the GUI 340 includes an indicator 342 of the current fuel dispenser and an indicator 344 of a grade of the fuel being pumped. As mentioned, information about a progress of the fueling process can be presented to the user. In this example, such information is displayed on the GUI 340 in the form of a visual indicator 346 of a current amount of fuel being obtained, which can be presented in association with a visual indicator 348 of a fuel price. The information about the progress of the fueling process can also be displayed in the form of a visual indicator 350 reflecting a current price of the acquired fuel. The information presented by the indicators 346, 350 can be updated as the fueling process proceeds. An additional visual indicator 352 can be presented as well, to indicate in a convenient and intuitive manner that the fueling is in progress. It should be appreciated that the visual indicator 352 is shown in FIG. 3C in a form a rotating wheel by way of example only, as any other type of indicator can be presented to the user.

The GUI 340 presented on the display 305 of the mobile device 304 while the fueling is in progress can include a variety of other information. For example, news, advertisements, promotions, special offers, and other information can be presented. The information can be presented to the user in an interactive manner such that the user can make a selection regarding a type of the information, upon which additional information on a particular event, offer, product, restaurant, local attraction, or other additional information. In this example, the GUI 340 includes a visual indictor 354 suggesting a user to view special offers. User input (e.g., a touch, tap, scroll, etc.) can be received with respect to the indicator 354 upon which information about the special offers can be displayed. It should be appreciated that the GUI 340 can additionally or alternatively include other visual indicators that improve experience of the user of the mobile device 304.

In at least some embodiments, the user of the mobile device 304 can track a progress of the fueling process through the mobile device, e.g., track a volume of fuel that has been dispensed so far, track how much money has been spent so far on dispensed fuel, track how much money is left in a pre-paid amount for fuel, etc. For example, a suitable representation of the progress can be displayed on the user interface, such as with a progress bar, a timer, a textual explanation of a current place in the fueling process, etc. The progress can be indicated in real time to the user, which can help the user manage timing, manage expectations, and/or identify problems that arise during the fueling that may require assistance from a fuel station employee. In this way, the interaction of the user with the fuel dispenser is simplified, thus improving user experience. It should be appreciated, however, that in at least some cases the user may still be able to manually operate the fuel dispenser to pay for fuel, if desired, instead of using the mobile device 304. Being able to manually operate the fuel dispenser 102 for payment can, e.g., accommodate an unexpected network problem that makes using the mobile device 304 difficult or impossible, allow the user to complete fuel payment in a sudden case of mobile device 304 battery depletion, accommodate users who do not have a mobile device, and accommodate users who for any reason do not want to use their mobile device to pay for fuel.

In at least some embodiments, the user experience can be improved by providing information to the mobile device 304 in addition to or instead of fueling progress information. The additional information can include any one or more of price data (e.g., price of the fuel being dispensed, price of each grade of fuel available at the fuel dispenser, etc.), fueling data (e.g., grade of fuel dispensed, etc.), and any suitable media content such as advertisements, news, loyalty promotions, movie previews and any other type of information which can be provided to the mobile device 304. In an exemplary embodiment, the additional information can be provided to the mobile device 304 in real time with the mobile device 304 being in established electronic communication via the connection 306 with the fuel dispenser 102—for example, while the fuel dispenser 102 is delivering fuel to a vehicle or other fuel container. As mentioned above, this can help improve the user's typical idle time experience. The fuel dispenser 102 can be configured to store the additional data therein and provide the stored data to the mobile device 304, and/or the fuel dispenser 102 can be configured to receive the additional information to be delivered to the mobile device 304 from an external source in any suitable manner. For example, the media content may be stored in memory of the fuel dispenser 102 or may be delivered to the fuel dispenser 102 in real time from an external source such as a cloud server. Exemplary embodiments of data that can be stored at or received by fuel dispensers include data described in previously mentioned U.S. Pat. No. 8,925,808 entitled "Fuel Dispenser Commerce" filed Nov. 13, 2006.

When the fueling process is completed, the mobile device 304 can be used to receive an electronic receipt of the transaction from the fuel dispenser 102. The mobile device 304 can be configured to display and/or store the receipt, as will be appreciated by a person skilled in the art.

In at least some embodiments, the additional information can be transmitted to the fuel dispenser 102 from the controller 310 and/or from some other source (e.g., a cloud server, another fuel dispenser, etc.) via the controller 310. In an exemplary embodiment, the controller 310 can be disposed remotely from the fuel dispenser 102 and can be configured to communicate with the fuel dispenser 102 via a wireless connection. In at least some embodiments, the controller 310 can include or can be in communication with memory (e.g., memory of a cloud server, etc.) that can store a profile associated with a user of the mobile device 304. The user can register (e.g., via the mobile device 304) with a loyalty or other service provided by a plurality of fuel dispensers including the fuel dispenser 102 (e.g., provided by any of multiple fuel dispensers at a particular fuel station, provided by any of multiple fuel dispensers having a common owner, etc.), and information relating to user's operation of any of the fuel dispensers can be stored in the user profile. The information can include any one or more of, e.g., a make, model and year of the user's vehicle, history of user refueling the vehicle, locations of the fuel dispensers where the refueling tool place, a type of credit card that the user used to pay for the fuel, etc. The user's historical fuel dispenser usage can thus be analyzed, which can help fuel dispenser owners, manufacturers, etc. understand user experiences, provide for improved user experiences in the future, and/or compare experiences of different users. User information can be gathered anonymously, which can help protect user privacy while still allowing for data analysis and the benefits associated therewith.

When the BLE connection 306 is established between the user's mobile device 304 and fuel dispenser 102, the information stored in the user profile (e.g., in the memory of the controller 310, etc.) can be accessed, and advertisements can be presented to the user based on the information stored in the profile. For example, if the user's vehicle is a luxury vehicle, and based on other information about the user, advertisements and promotions about more expensive places and stores carrying luxury goods can be provided to the user. For another example, depending on locations of gas stations where the user typically refuels his or her vehicle, advertisements about places along routes adjacent to those gas stations can be presented. Media content can be presented to the user based on a type of media content that the user previously found engaging, e.g., based on advertisements previously clicked on by the user.

In an exemplary embodiment, a mobile device being used in a fuel purchase context, e.g., being used to facilitate purchase of fuel from the fuel dispenser, interacts with only the one fuel dispenser dispensing the fuel. This can help ensure a secure transaction and/or can help ensure that fuel is only dispensed from one nozzle of the fuel dispenser at a time in the case of fuel dispensers having multiple nozzles from which fuel can be dispensed (e.g., nozzles each dispensing a different fuel grade, etc.).

Figure 4:
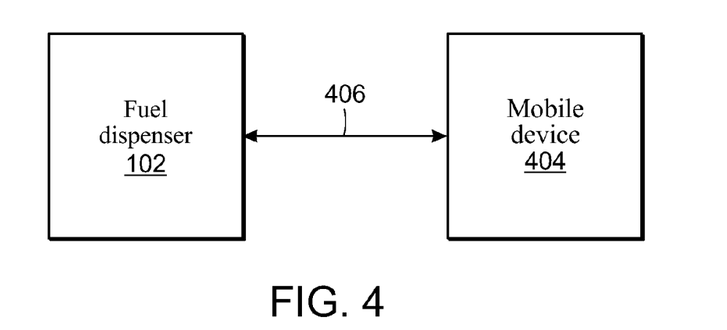
FIG. 4 is another block diagram illustrating a fuel dispenser and a mobile device communicating in accordance with at least some embodiments.

In at least some embodiments, a mobile device can be configured to interact with one or more fuel dispensers in a context other than fuel purchase. Examples of such contexts include inspection and servicing. FIG. 4 illustrates an embodiment of a system including a fuel dispenser 102 and a mobile device 404 that can interact via a BLE connection 406 in a context other than fuel purchase. In this illustrated embodiment, the mobile device 404 communicates with a single fuel dispenser 102 for some purpose related to that fuel dispenser 102. Communicating with only the one fuel dispenser 102 can help ensure that the mobile device 404 only communicates data to a trusted destination, does not cause unintended changes in any other fuel dispensers when making a change to the fuel dispenser 102 using the mobile device 404, and/or receives data specific to that fuel dispenser 102. Receiving data from only one specific fuel dispenser is typically important in evaluating that fuel dispenser's compliance with government regulations.

For an example of interaction with the single fuel dispenser 102, the mobile device 404 can be used by a site operator (e.g., a member of gas station personnel, etc.) to interact with the single fuel dispenser 102 in a non-fuel dispensing context. The site operator may use the described techniques to control operation of the fuel dispenser 102. For example, when a customer arrives at a gas station, the site operator can obtain a consumer payment card, swipe the card using a suitable device, such as the mobile device 404 or a card reader, and then enable the fuel dispenser 102 to dispense fuel to the customer's vehicle and manage the transaction experience. In at least some embodiments, site operators can also manage media content on the fuel dispenser 102, which can involve managing storing and/or delivering the media content to other devices. For another example of interaction with the single fuel dispenser 102, the mobile device 404 can be used by a serviceman to interact with the single fuel dispenser 102 in a non-fuel dispensing context, such as to upgrade software of the fuel dispenser 102 using the mobile device 404 or to calibrate the fuel dispenser 102. Calibration of fuel dispensers is described, for example, in U.S. Pat. No. 7,941,289 entitled "Fuel Dispenser Calibration" filed on Dec. 21, 2007, which is hereby incorporated by reference in its entirety. For yet another example of interaction with the single fuel dispenser 102, the mobile device 404 can be used by a government inspector to interact with the single fuel dispenser 102 in a non-fuel dispensing context, such as to check relevant functionality of the fuel dispenser using the mobile device 404.

Figure 5:
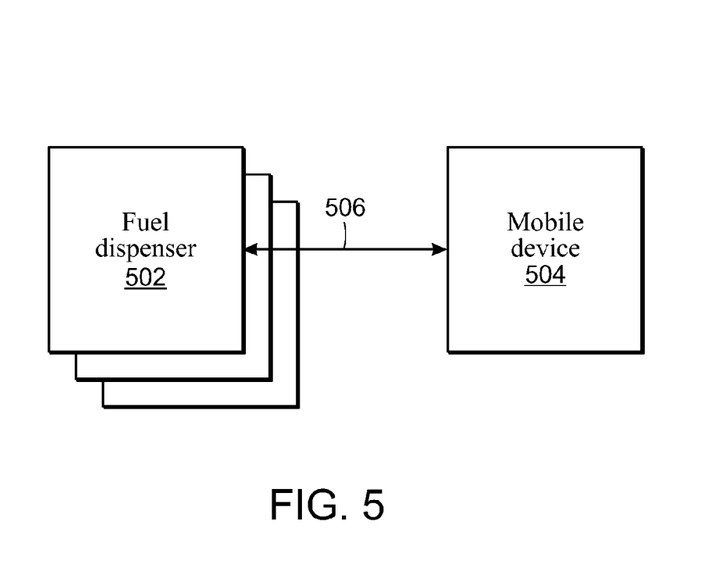
FIG. 5 is another block diagram illustrating a fuel dispenser and a mobile device communicating in accordance with at least some embodiments.

FIG. 5 illustrates an embodiment of a system including a plurality of fuel dispensers 502 and a mobile device 504 that can interact via a BLE connection 506 in a context other than fuel purchase. Arrangements of a plurality of fuel dispensers are described for example, in U.S. application Ser. No. 11/559,211 entitled "Fuel Dispenser Management" filed Nov. 13, 2006, which is hereby incorporated by reference in its entirety. In the illustrated embodiment of FIG. 5, the mobile device 404 is simultaneously connected with the plurality of fuel dispensers 502 via the connection 506, which can be established by each of the fuel dispensers 502. The mobile device 504 can thus be configured to receive data from and to transmit data to any or all of the fuel dispensers 502, which can improve efficiency in data transmission and/or can allow more than one fuel dispenser to be serviced or inspected at a time.

With the mobile device 504 in communication with the fuel dispensers 502, the mobile device 504 can be used to service one or more of the fuel dispensers 502, which can include configuring the fuel dispensers 502 in a suitable manner. The mobile device 504 can thus allow a user to provide a single instruction (or set of instructions, as appropriate) to service multiple fuel dispensers at once, thereby saving time, providing for efficiency in data transmission, and/or reducing a chance for errors. For example, the mobile device 504 can be used to install software and/or firmware on each of the fuel dispensers 502.

With the mobile device 504 in communication with the fuel dispensers 502, the mobile device 504 can be used to acquire information stored on one or more of the fuel dispensers 502, such as information about a status of the dispenser, health information, maintenance logs, error logs, and any other information. Exemplary embodiments of information that can be received by the mobile device 504 from the fuel dispensers 502 include data described in previously mentioned U.S. Pat. No. 8,925,808 entitled "Fuel Dispenser Commerce" filed Nov. 13, 2006. The information received by the mobile device 504 can be reviewed by the user. Additionally or alternatively, the received information can be processed by the mobile device 504, and results of the processing can be presented to the user on a display of the mobile device 504 and/or can be presented to other users (e.g., to the user's supervisor, to a manufacturer of the fuel dispenser, etc.) by transmitting the data to an external device via a network. For example, information relating to the status of the fuel dispensers (e.g., information about one or more components, power status, etc.) can be analyzed for compliance with local, state, and federal regulations, and results can be presented to the user on the mobile device 504. Additionally or alternatively, information relating to the status of the fuel dispenser can be analyzed to determine whether any actions are required to be taken to service or otherwise attend to any of the fuel dispensers 502. For example, one or more indications can be provided to the user if it is determined that any of the fuel dispensers requires immediate attention, e.g., has a power supply problem, has outdated firmware, has outdated fuel price information, fails to meet at least one regulatory requirement, etc. Troubleshooting information can be provided to the user via the mobile device 504 to help the user address the issue(s) requiring immediate attention. It should be appreciated that the information can be processed in any other manner and the results of the processing can be presented in other ways.

The described techniques that enable a service technician or any other user to communicate with multiple fuel dispensers simultaneously can have any number of advantages. For example, a time required to service the dispensers can be significantly decreased since instead of communicating with one dispenser at a time, the user can communicate with multiple dispensers in parallel, the user can be able to compare health and other information acquired from the fuel dispenser which can be useful to access overall condition of a gas station or other fuel filling station, and/or, since some problems or performance issues can be more complicated to detect when a single fuel dispenser is analyzed, a problem detected in connection with dispensers can reveal an undesirable a condition of the entire gas station or other fuel filling station is compromised.

In at least some embodiments, instead of processing the received information locally at the mobile device 504, the mobile device 504 can be configured to transmit the information to another device that can perform the processing, which can help conserve resources of the mobile device 504, can allow for greater processing power than available on the mobile device 504, and/or can facilitate comparison of the information with data received from other fuel dispensers communicated using other mobile devices and/or by other users in order to, e.g., determine trends, identify problem fuel dispensers, identify problem fuel stations, etc. The mobile device 504 can be configured to receive results of the externally-performed processing, e.g., wirelessly receive the data over a network, etc., which can help the user learn about the collected information and/or allow the user to address any identified problems. The mobile device 504 can be configured to receive the results immediately after the processing, which can allow the user to address any identified problems while still on site with the fuel dispensers 502.

In at least some embodiments, whether communicating with one fuel dispenser at a time or with a plurality of fuel dispensers at a same time, the fuel dispenser(s) being communicated with can be equipped with one or more sensors each configured to detect a parameter relevant to operation of the fuel dispenser with which it is associated, such as, for example, gasoline sensors that can detect excessive levels of gasoline in the environment which can indicate a leakage or temperature sensors that can detect temperature inside fuel dispenser housings. Information acquired by the one or more sensors can be transmitted from the fuel dispenser to the mobile device, and the mobile device (and/or an external processor to which the mobile device communicates the information) can be configured to process the information to determine whether the information has any indicators or abnormal values of parameters associated with the fuel dispenser.

Whether communicating with one fuel dispenser at a time or with a plurality of fuel dispensers at a same time, a user of a BLE-enabled mobile device can be located in proximity to the fuel dispenser(s). However, a need for the user to physically interact with the dispenser(s) communicated with can be reduced, if not eliminated. For example, the user can remain within a vehicle used to drive up to the dispenser(s) and can use the mobile device within the vehicle to interact with the dispenser(s). Thus, costs and service time can be reduced and/or user experience can be improved. User experience can be especially improved in settings where it is desirable for a user to remain inside the vehicle (e.g., in inclement weather conditions, when the user has mobility issues, when it is dark late at night, etc.).

Whether communicating with one fuel dispenser at a time or with a plurality of fuel dispensers at a same time, a user of the BLE-enabled mobile device can approach the fuel dispenser(s), e.g., on foot, in a vehicle, etc., such that the mobile device is within a range of a BLE beacon of the fuel dispenser and the fuel dispenser can then begin communicating with the mobile device. The communication can be initiated automatically, in response to the BLE beacon of the fuel dispenser detecting the mobile device and a BLE connection being established between the fuel dispenser and the mobile device. In at least some embodiments, a fuel dispenser can be configured to begin preparing data to transmit to the mobile device automatically connected thereto so the data is ready for transmission upon request by the user. For example, the fuel dispenser can be configured to determine one or more media appropriate for the mobile device identified as being associated with a user registered with a loyalty program such that the media can be quickly delivered to the user when appropriate, e.g., during fuel pumping.

In at least some embodiments, a user interface can be presented on a display of the mobile device before a BLE connection has been established (e.g., when one or more fuel dispensers are advertising their presence) and/or in response to the BLE connection being established. The user interface can have a representation of the fuel dispenser that allows the user to interact with the fuel dispenser via the mobile device.

When the mobile device is communicating with multiple fuel dispensers simultaneously, multiple representations each representing a respective fuel dispenser can be displayed on the user interface. The representations can be in a graphical, textual, or in any other format, as described embodiments are not limited in this respect. For example, the representations can include one or more icons resembling a fuel dispenser. However, any other type of representation can be used. The representations of the fuel dispensers can be presented on the mobile device such that they are disposed with respect to each other in a way that corresponds to the actual relative positions of the fuel dispensers. Additionally or alternatively, the representations can be associated with textual or other information identifying each dispenser.

The representations can be interactive such that the mobile device can receive user input (e.g., touch or other type) with respect to the representation to thus interact with the fuel dispenser. For example, the user can select one or more of the fuel dispensers by selecting a respective representation of the dispenser(s). In response to interaction with the representation of the fuel dispenser, additional information associated with the fuel dispenser (e.g., logs, problems, service history, etc.) can be acquired by the mobile device. Also, the mobile device can be configured to transmit configuration and other instructions to the fuel dispenser, for example, to update software stored in a memory of the fuel dispenser and for other purposes.

It should be appreciated that, in the above examples, the mobile device 304 (FIG. 3A), the mobile device 404 (FIG. 4) and mobile device 504 (FIG. 5) can be similar to the user device 104. Moreover, embodiments described herein are not limited to any particular type of a device operated by a user and any mobile device that can be configured to establish a BLE connection may be utilized.

Figure 6A:
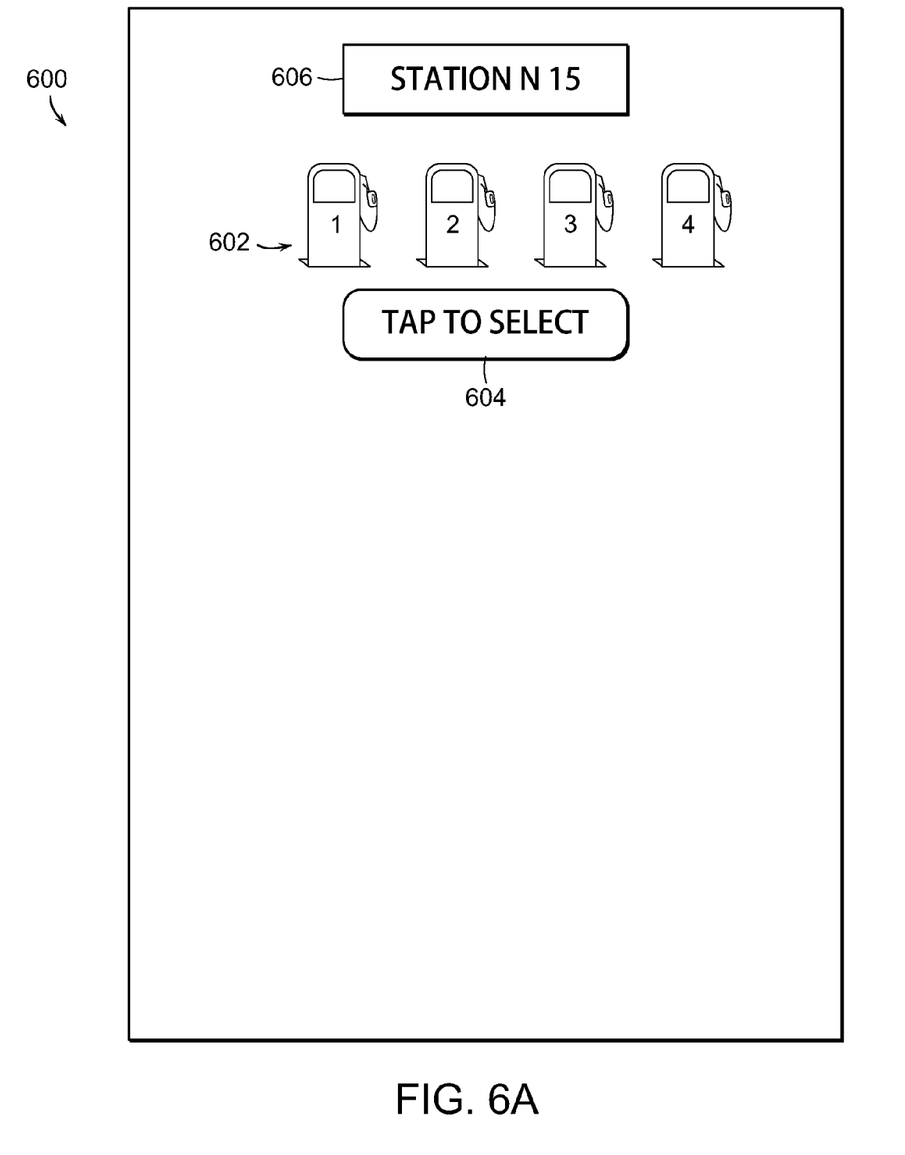
FIG. 6A is a diagram illustrating a graphical user interface rendered on a display of a mobile device communicating with multiple fuel dispensers in accordance with at least some embodiments.

FIGS. 6A and 6B illustrate examples of GUIs that can be presented on a display of a BLE-enabled mobile device when the mobile device is communicating with multiple fuel dispensers simultaneously. When a user of the mobile device, such as a serviceman or other user, approaches a gas station or other fueling station and the mobile device is within a range of BLE beacons associated with fuel dispensers at that station, the fuel dispensers can advertise their presence to the mobile device. As shown in FIG. 6A, a GUI 600, which can be presented on the display of the mobile device, includes indicators 602 each representing a respective fuel dispenser, an indicator 604 prompting the user to make a selection with respect to one or more of the indicators 602, an indicator 606 including identification information about the gas station. In this example, four indicators 602 representing fuel dispensers are shown by way of example only. Any other visual indicators and other information can be presented on GUI 600 additionally or alternatively. For example, information on a current time, location, weather, strength of a wireless connection signal, a BLE connection indicator, and/or any other information can be presented. Also, any number of fuel dispensers can be identified.

Figure 6B:
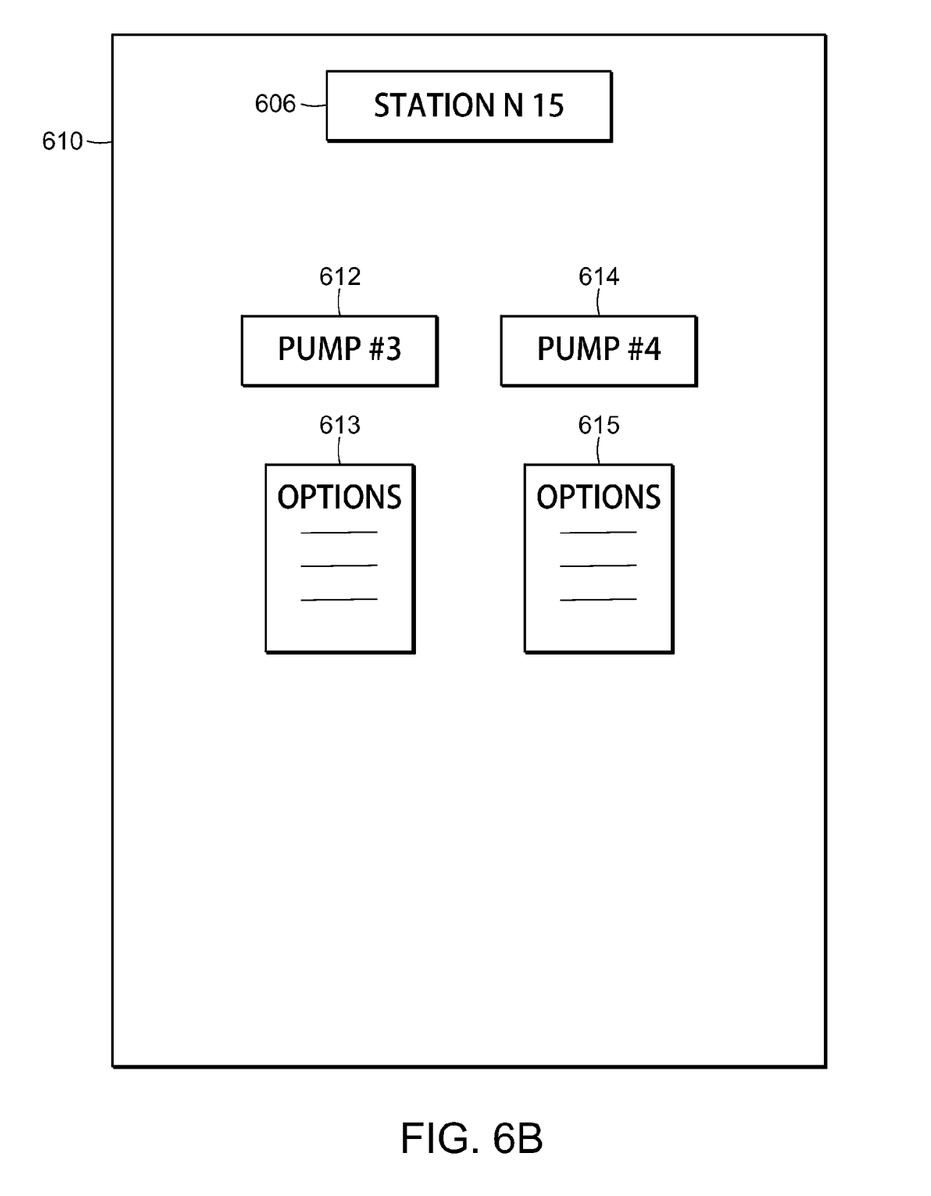
FIG. 6B is another diagram illustrating a graphical user interface rendered on a display of a mobile device communicating with multiple fuel dispensers in accordance with at least some embodiments.

After a user input with respect to one or more of the indicators 602, indicating a selection of the respective one or more of the fuel dispensers, is received in a suitable manner (e.g., based on a touch, tap, press, voice input, gesture input, etc.), a GUI 610 as shown in FIG. 6B can be rendered on the display of the mobile device. As shown in FIG. 6B, the GUI 610 can include indicators 612, 614 representing fuel dispensers "3" and "4" selected based on the received user input. The fuel dispenser indicators 612, 614 are accompanied by indicators 613, 615, respectively, representing selectable options for interaction with the fuel dispensers represented by the indicators 612, 614. The options can include the dispenser's maintenance log, error log, fuel purchasing history, health information, performance of that dispenser in comparison to other dispensers, information acquired by sensors associated with the dispenser, and any other options. The options can be presented on the GUI 610 in a manner such that user input can be received with respect to one or more options upon which corresponding information can be displayed on the display or otherwise provided to the mobile device. Additional options can also be presented with respect to one or more of the selected options collectively denoted by the indicators 613, 615.

Figure 7:
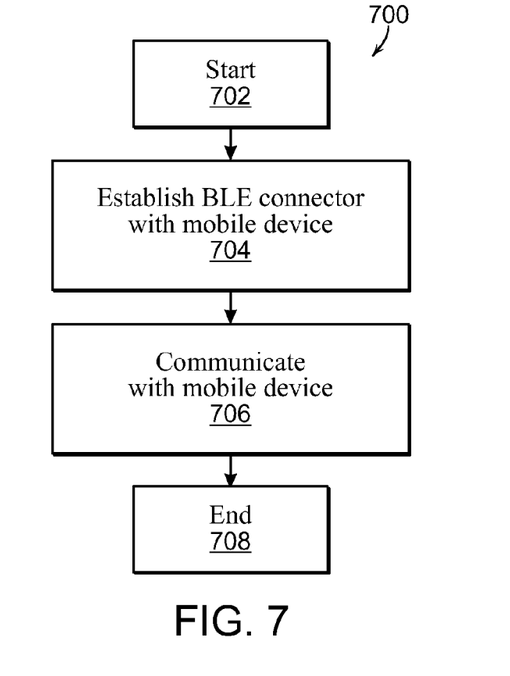
FIG. 7 is a flowchart that depicts a method of operating a fuel dispenser in accordance with at least some embodiments.

FIG. 7 illustrates an embodiment of process 700 of operating a fuel dispenser (e.g., the fuel dispenser 102 or 502) to communicate with a mobile device (e.g., the mobile device 104, 304, 404 or 504). This process embodiment is described in a BLE context but can be performed similarly using another communication type. The process 700 can start at block 702 in a suitable manner, such as automatically when the BLE-enabled mobile device is within the range of a BLE beacon of the fuel dispenser (e.g., when a vehicle operated by a user of the mobile device approaches the fuel dispenser). However, in some cases, the process 700 can start upon a trigger, such as user input or other triggers. The fuel dispenser can include a non-transitory tangible computer-readable storage media which can store computer-executable instructions that, when executed by one or more processors of the mobile device, can perform one or more steps of process 700.

At block 704, the fuel dispenser can advertise its presence to the mobile device in proximity to the fuel dispenser, upon which the mobile device can initiate a BLE connection between the dispenser and the device. As discussed above, both the fuel dispenser and mobile device can be or include BLE-enabled devices that can pair and establish a BLE connection in any of variety of ways, as will be appreciated by a person skilled in the art. Once the BLE connection between the fuel dispenser and the mobile device is established, the fuel dispenser can communicate with the mobile device at block 606. As discussed herein, the communication can include receiving input from the mobile device relating to controlling operation of the fuel dispenser, such as to select a fuel grade and to deliver fuel to a vehicle or other equipment. Additionally or alternatively, as discussed herein, the communication can include the fuel dispenser communicating with the mobile device to transmit information to the mobile device during a time when the fuel dispenser delivers fuel to the vehicle, and/or the fuel dispenser communicating information to the mobile device prior to and/or after the time when the fuel dispenser delivers fuel to the vehicle. As mentioned above, the information transmitted to the mobile device can include data such as advertisements, loyalty promotions, news, music, video, application, etc.

In embodiments in which the fuel dispenser communicates at block 706 with a mobile device used to control operation of the fuel dispenser, the fuel dispenser can be configured to provide various information to the mobile device, as discussed herein, such as logs, media information, operating status of the fuel dispenser, health information relating to various operating conditions of the fuel dispenser, etc.

The process 700 can end at block 708. For example, the process 700 can complete when the mobile device is outside of the range of the fuel dispenser. For another example, the process 600 can complete once the fueling process is completed.

Figure 8:
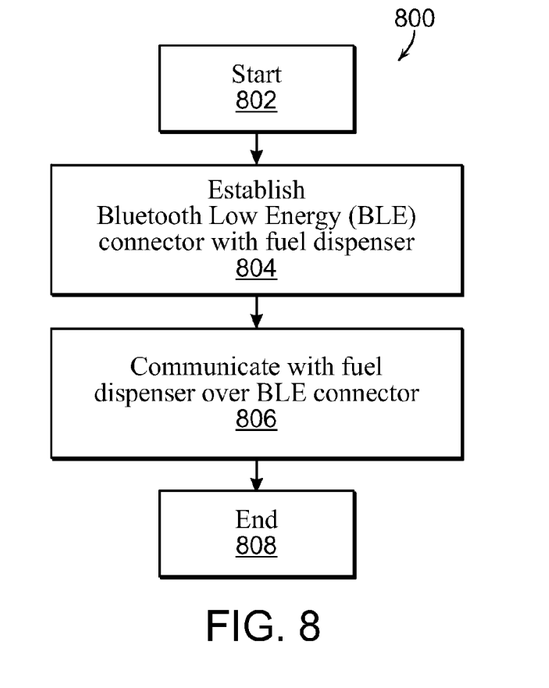
FIG. 8 is a flowchart that depicts a method of operating a mobile device in accordance with at least some embodiments.

FIG. 8 illustrates an embodiment of a process 800 of operating a mobile device (e.g., the mobile device 104, 304, 404 or 504) to communicate with a fuel dispenser (e.g., the fuel dispenser 102 or 502). This process embodiment is described in a BLE context but can be performed similarly using another communication type. The process 800 can start at block 802 in a suitable manner, such as automatically when the BLE-enabled mobile device is within the range of a BLE beacon of the fuel dispenser (e.g., when a vehicle operated by a user of the mobile device approaches the fuel dispenser). However, in some cases, the process 800 can start upon a trigger, such as user input or other trigger received via the mobile device. The mobile device can include a non-transitory tangible computer-readable storage media which can store computer-executable instructions that, when executed by one or more processors of the mobile device, can perform one or more steps of process 800.

At block 804, a BLE connection can be established between the mobile device and the fuel dispenser. Next, at block 806, the mobile device can communicate with the fuel dispenser over the BLE connection. For example, as discussed above, the communication can involve instructing the fuel dispenser to deliver fuel to a reservoir and interacting with the fuel dispenser to pay for the fuel. As also discussed herein, the mobile device can be configured to display on a display thereof information relating to delivering by the fuel dispenser fuel to a reservoir (e.g., a fuel tank of a vehicle). For another example, as discussed above, the communication can include configuring software, hardware and/or firmware on the fuel dispenser, installing software and/or firmware on the fuel dispenser, and/or collecting information relating to operation of the fuel dispenser.

The process 800 can end at block 808. For example, the process 800 can end when the mobile device is outside of the range of the fuel dispenser. For another example, the process 800 can end based on user input received via the mobile device.

While various methods disclosed herein may be shown in relation to flowcharts or sequence diagrams, it should be noted that any ordering of method steps implied by such flowcharts, sequence diagrams, or the description thereof is not to be construed as limiting the method to performing the steps in that order. Rather, the various steps of each of the methods disclosed herein can be performed in any of a variety of sequences. In addition, as the illustrated flowcharts and sequence diagrams are merely exemplary embodiments, various other methods that include additional steps or include fewer steps than illustrated are also within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a fuel dispenser to communicate with a mobile device, the method comprising:
   detecting a mobile device in proximity to a fuel dispenser using a Bluetooth Low Energy (BLE) connection with the mobile device, wherein detecting the mobile device comprises establishing a secure two-way connection with the mobile device;
   in response to establishing the secure two-way connection, automatically identifying a user associated with the mobile device; and
   the fuel dispenser communicating with the mobile device to
      receive input from the mobile device relating to controlling operation of the fuel dispenser to deliver fuel to a vehicle, and
      transmit information to the mobile device during a time when the fuel dispenser delivers fuel to the vehicle, wherein the information is selected based on the identified user.

2. The method of claim 1, wherein the information is transmitted to the mobile device automatically, without input from a user of the mobile device.

3. The method of claim 1, wherein the information comprises multimedia information.

4. The method of claim 1, wherein the input comprises at least one parameter relating to delivering fuel from the fuel dispenser to the vehicle.

5. A communication system, the system comprising:
   a wireless transceiver configured to detect a mobile device in proximity to a fuel dispenser using a Bluetooth Low Energy (BLE) beacon emitted by the fuel dispenser; and
   a processor configured to
      cause a graphical user interface (GUI) related to the fuel dispenser to be displayed on the mobile device detected to be in proximity to the fuel dispenser prior to a BLE connection being established with the mobile device detected to be in proximity of the fuel dispenser,
      establish the BLE connection with the mobile device and then receive input from the mobile device relating to controlling operation of a fuel dispenser to deliver fuel to a vehicle, and
      provide information to the mobile device.

6. The system of claim 5, wherein the information comprises first information and second information.

7. The system of claim 6, wherein the first information comprises information relating to controlling operation of the fuel dispenser to deliver fuel to the vehicle.

8. The system of claim 7, wherein the first information comprises at least a portion of information presented on a display of a fuel dispenser.

9. The system of claim 7, wherein the second information comprises additional information that is provided to the mobile device during a time when the fuel dispenser delivers fuel to the vehicle.

10. A method of operating a mobile computing device to communicate with a fuel dispenser, comprising:
    simultaneously detecting a Bluetooth Low Energy (BLE) beacon emitted from each of a plurality of fuel dispensers;
    receiving a signal indicative of a selection of one of the plurality of fuel dispensers, the signal being one of a user input to the mobile device selecting the one of the plurality of fuel dispensers and a signal generated at the mobile device based on which of the plurality of fuel dispensers is located closest to the mobile device;
    establishing a secure BLE connection with the selected fuel dispenser; and
    communicating with the selected fuel dispenser over the secure BLE connection.

11. The method of claim 10, wherein communicating with the fuel dispenser comprises instructing the fuel dispenser to deliver fuel to a reservoir.

12. The method of claim 11, further comprising displaying on a display of the mobile computing device information relating to the delivery of fuel from the fuel dispenser to a reservoir.

13. The method of claim 12, wherein the reservoir comprises a fuel tank of a vehicle.

14. The method of claim 10, wherein communicating with the fuel dispenser comprises configuring the fuel dispenser over the BLE connection.

15. The method of claim 14, wherein configuring the fuel dispenser comprises configuring at least one of software, hardware, and firmware of the fuel dispenser.

16. The method of claim 10, wherein communicating with the fuel dispenser comprises at least one of installing at least one of software and firmware on the fuel dispenser, collecting information relating to an operating status of the fuel dispenser, and collecting information relating to history of operation of the fuel dispenser.

17. A non-transitory computer-readable storage medium storing computer-executable instructions that, when executed by at least one processor, cause the at least one processor to perform a method comprising:
    displaying a graphical user interface (GUI) on a mobile device in response to the mobile device receiving a wireless Bluetooth Low Energy (BLE) beacon being emitted from a fuel dispenser located in proximity to the mobile device;
    after displaying the GUI, establishing a secure BLE connection between the fuel dispenser and the mobile device; and
    interacting with the fuel dispenser located in proximity to the mobile computing device over the BLE connection.

18. The non-transitory computer-readable storage medium of claim 17, wherein interacting with the fuel dispenser comprises at least one of instructing the fuel dispenser to deliver fuel to a reservoir and interacting with the fuel dispenser to perform payment for the fuel.

19. The non-transitory computer-readable storage medium of claim 18, wherein interacting with the fuel dispenser comprises receiving user input via a display of the mobile device.

20. The non-transitory computer-readable storage medium of claim 17, wherein interacting with the fuel dispenser comprises at least one of receiving content from the fuel dispenser at a time when the fuel dispenser is delivering fuel to a reservoir, and providing at least one instruction to the fuel dispenser to configure at least one component of the fuel dispenser.

* * * * *